United States Patent [19]
Ornstein

[11] 3,767,370
[45] Oct. 23, 1973

[54] COMPOSITE THERMOSTAT MATERIAL
[75] Inventor: Jacob L. Ornstein, Norton, Mass.
[73] Assignee: Texas Instruments Incorporation, Dallas, Tex.
[22] Filed: Nov. 22, 1971
[21] Appl. No.: 200,727

[52] U.S. Cl. ............................................... 29/195.5
[51] Int. Cl. ............................................ B32b 15/00
[58] Field of Search .................................. 29/195.5

[56] References Cited
UNITED STATES PATENTS
| | | | |
|---|---|---|---|
| 2,327,500 | 8/1943 | Chace | 29/195.5 |
| 3,102,793 | 9/1963 | Alban | 29/195.5 |
| 3,563,712 | 2/1971 | Zeigler | 29/195.5 |

Primary Examiner—Hyland Bizot
Attorney—Harold Levine et al.

[57] ABSTRACT

A multilayer composite thermostat material is disclosed having predetermined characteristics of electrical resistivity and a substantially constant deformation resistance responsive to exposure to elevated temperatures over a predetermined temperature range. The composite includes a first outer layer of a first preselected metallic alloy having a relatively high coefficient of thermal expansion, a second outer layer of a second preselected metallic alloy having a relatively lower coefficient of thermal expansion, and an intermediate layer of a third preselected metallic, non-ferrous material having a resistivity of between approximately 10 ohms per circular mil foot to 30 ohms per circular mil foot and a substantially constant deformation resistance responsive to exposure to elevated temperatures up to approximately 500°C.

2 Claims, 1 Drawing Figure

PATENTED OCT 23 1973 3,767,370
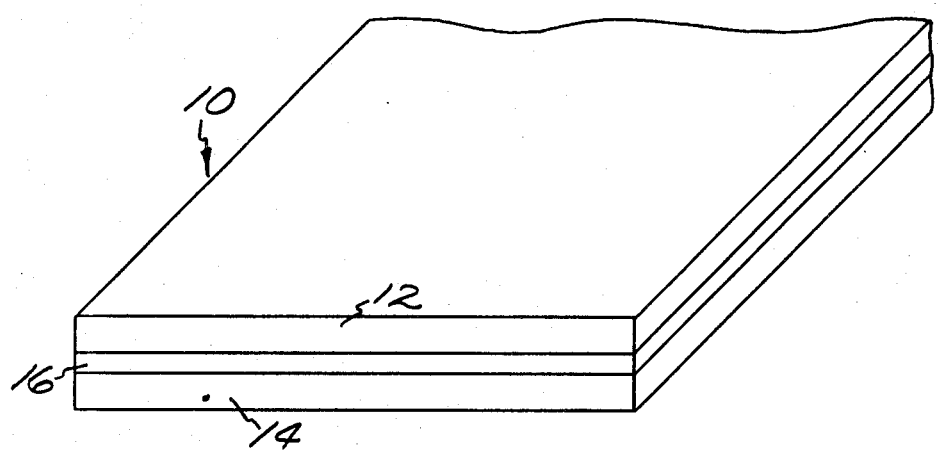
INVENTOR.
BY Jacob L. Ornstein
Gerald B. Epstein
Att'y

COMPOSITE THERMOSTAT MATERIAL

The present invention relates generally to thermostat materials and more particularly is directed to an improved multilayer composite thermostat material.

As the usage of thermostat materials for various applications has increased in recent years it has become necessary to provide such materials having a wide variety of characteristics in order to achieve the desired functions. Accordingly, previously available bimetal thermostat materials, in which a pair of layers of metallic material having substantially different coefficients of thermal expansion have in many instances been replaced by multilayer composite materials in which an additional intermediate or shunt layer has been introduced between the outer layers so as to permit variations in certain of the characteristics of the composite thermostat material such as the resistivity, the flexivity, etc. By suitable selecting the material comprising the intermediate shunt layer it has been possible to devise various thermostat materials which have properties which could be only achieved at relatively great expense or not at all in conventional bi-metal type structures. For example, in providing composite thermostat materials in which a low resistivity of perhaps 15 to 100 ohms per circular mil foot, an intermediate shunt layer comprising a copper-silver alloy may be utilized in view of the relatively low resistance of such a material which imparts a desired lower resistivity to the composite while not substantially adversely affecting the flexivity thereof.

However, certain difficulties have arisen as a result of introducing a low resistivity intermediate shunt layer of this type since materials exhibiting lower resistivity generally have a tendency to soften when exposed to elevated temperature levels. As a result a composite thermostat material utilizing such an intermediate shunt layer is similarly subject to a relatively rapid dissipation in its mechanical strength upon exposure to an elevated temperature thereby resulting in a structure which is substantially useless under many circumstances.

Accordingly, it is an object of the present invention to provide an improved composite thermostat material having desired characteristics of resistivity and flexivity and which is suitable for use over a substantially extended temperature range.

It is another object of the present invention to provide an improved composite thermostat material which is durable in use, has good corrosion resistance properties, and is relatively economical to fabricate.

Various additional objects and advantages of the present invention will become readily apparent from the following detailed description and accompanying drawing wherein:

The sole drawing is a perspective view of the composite thermostat material of the present invention.

Referring in detail to the drawing, a strip of composite thermostat material in accordance with the principles of the present invention is illustrated and indicated generally by the reference numeral 10. As illustrated, the composite thermostat material 10 includes a first outer layer 12 of a first preselected metallic alloy having a relatively high coefficient of thermal expansion, a second outer layer of a second preselected metallic alloy having a relatively lower coefficient of thermal expansion with respect to the first preselected material and an intermediate layer 16 comprising a metallic, non-ferrous material having a resistivity between approximately 10 ohms per circular mil foot to 30 ohms per circular mil foot and having a substantially constant deformation resistance responsive to exposure to elevated temperatures up to approximately 500°C. The composite thermostat material which is illustrated preferably has a resistivity between approximately 15 ohms per circular mil foot to 100 ohms per circular mil foot and a flexivity of between approximately $100 \times 10^{-7}$ to $160 \times 10^{-7}$ inch per inch per degree Fahrenheit and does not exhibit softening, which would adversely affect the characteristics of the composite material 10 for use as a thermostat material up to a temperature of approximately 500° C. The particular values of resistivity and flexivity noted above, of course, are dependent upon the particular materials selected for use in fabricating the various layers as well as the relative thicknesses of the respective layers. In fabrication of the composite thermostat material the first and second outer layers 12, 14 are metallurgically bonded, preferably solid-phase bonded, to the opposed surfaces of the intermediate layer 16, the bonds between the respective metallic layers extending substantially throughout the entire contiguous surfaces of the layers defining the composite material 10. The various layers are preferably solid-phase bonded together in the manner described, for example, in U.S. Pat. Nos. 2,691,815 and 2,753,623. Alternatively, if desired, various other bonding techniques may be utilized for metallurgically bonding the layers together within the scope of the present invention. It may be noted that the thickness of the composite material 10 may vary from approximately 0.001 inch to 0.100 inch. The illustrated composite thermostat material 10 thus comprises an integral unit adapted to flex in response to temperature changes and is suitable for use in a wide variety of applications and in particular may be usable in situations in which substantially elevated temperatures are anticipated.

In accordance with an important feature of the present invention the high strength characteristics of the composite thermostat material 10 particularly under elevated temperature conditions are substantially improved by the utilization of a material comprising the intermediate layer which has a high mechanical strength at elevated temperatures without exhibiting any significant increase in resistivity. Although a variety of metals and alloys satisfy such conditions all of such materials have the characteristics of being hardenable by either solid solution or precipitation hardening mechanisms. In addition, it is desirable that the material comprising the intermediate layer in combination with the first and second outer layers provides a composite material having the above-described characteristics of resistivity and flexivity as well as resistance to deformation upon exposure to elevated temperatures and good corrosion resistance properties, as well as exhibiting a useful deflection over a substantial temperature range, while still further permitting convenient adjustment of the resistivity and flexivity of the composite material by variations in the thickness thereof relative to that of the first and second outer layers. More particularly, the intermediate layer 16 preferably comprises a material which is an alloy of copper having the above-described resistivity characteristics and high temperature deformation characteristics. In this regard it has been found that certain alloys of copper are particularly advantageous in this respect an in view of their availability at a relatively low cost may be conveniently utilized. More particularly, the intermediate layer 16 may comprise a copper alloy which includes a preselected amount of zirconium, it may comprise a copper alloy which includes a preselected amount of chromium, or it may comprise a copper alloy which includes a preselected amount of tellurium and a trace amount of phosphorous. As typical examples of such alloys which have been found to be particularly advantageous for use, the intermediate layer may comprise an alloy of copper which comprises by weight approximately 0.15 percent zirconium and the balance copper, a material which comprises by weight approximately 0.95 percent chromium and the balance copper, or a copper alloy which comprises by weight approximately 0.5 percent tellurium, 0.007 percent phosphorous, and the balance copper. In addition, in certain instances, it has been found that certain commercially pure metallic elemental materials may be utilized in defining the intermediate layer 16. Typical examples of such elemental materials include molybdenum, rhodium, and indium, although the above-described copper alloys are preferable for use in most instances.

The above-described intermediate layer 16 may be referred to as a shunt layer, since it substantially affects the resistivity and may affect other properties of the resultant composite material, such as flexivity, overall mechanical strength, etc. Furthermore, the properties of the overall composite material 10 may be varied as desired within the above-described limits by suitable selection of the materials comprising the first and second outer layers 12, 14 as well as by varying the relative thicknesses of the respective layers so as to provide a structure having useful characteristics of resistivity and flexivity as well as a substantially constant resistance to mechanical deformation upon exposure to elevated temperatures. The relative thickness of the intermediate layer 16 may vary between approximately 5 percent to 60 percent of the total thickness of the composite material, while the first outer layer may vary in thickness between approximately 5 percent to 45 percent of the total thickness of the composite and the second outer layer may vary in thickness between approximately 35 percent to 50 percent of the total thickness of the composite material. In addition, the resistivity of the intermediate layer, is at least an order of magnitude and may be several orders of magnitude less than the resistivity of either of the first and second outer layers 12, 14 and in the illustrated embodiment preferably varies between approximately 10 ohms per circular mil foot to 30 ohms per circular mil foot while retaining a substantially constant resistance to deformation over a temperature range of between approximately $-100°C$ to $500°C$. Such a low resistivity over a substantial temperature range of this nature is quite advantageous since this permits convenient adjustment of the resistivity of the overall composite material to a desired level by merely varying the thickness of the intermediate layer relative to that of the substantially higher resistivity first and second outer layers 12, 14 without affecting the high temperature strength characteristics of the composite material. Similarly, the resultant composite material preferably has a resistivity of between approximately 15 ohms per circular mil foot to 100 ohms per circular mil foot and a flexivity of between approximately $100 \times 10^{-7}$ to $160 \times 10^{-7}$ inch per inch per degree Fahrenheit over a temperature range of approximately $100°C$ to $500°C$.

In the process of selecting suitable materials comprising the first and second outer layers 12, 14 which, as previously indicated are respectively of materials having a relatively high coefficient of thermal expansion and a relatively lower coefficient of thermal expansion, a wide variety of materials may be utilized which are compatible with the previously described preferred examples of copper alloys comprising the intermediate layer 16. For example, the first outer layer may comprise a material which comprises by weight approximately 22 percent nickel, 3 percent chromium, and the balance iron commonly known as alloy B which has a coefficient of thermal expansion of approximately $10.5 \times 10^{-6}$ inch per inch per degree Fahrenheit and a resistivity of approximately 460 ohms per circular mil foot. Similarly, a material may be utilized which comprises by weight approximately 72 percent manganese, 18 percent copper, and 10 percent nickel which is commonly known as alloy P and has a coefficient of thermal expansion of approximately $15.0 \times 10^{-6}$ inch per inch per degree Fahrenheit and a resistivity of 1,019 ohms per circular mil foot. The second outer layer 14, similarly may comprise one of several materials and, for example, may comprise a material which comprises by weight approximately 35 ½ percent to 36 ½ percent nickel and the balance iron which is commonly known as Invar or alloy 10 and has a coefficient of thermal expansion of approximately $0.7 \times 10^{-6}$ inch per inch per degree Fahrenheit and a resistivity of approximately 484 ohms per circular mil foot. These examples of specific materials comprising the first and second outer layers 12, 14 are purely illustrative and are merely presented as examples of typical, commonly commercially available, relatively inexpensive materials which are suitable for use in fabricating a composite thermostat material in accordance with the present invention so as to provide a composite thermostat material having the above-noted desired characteristics.

The materials utilized in fabricating the various layers, as described hereinabove, may be characterized by good corrosion resistance and ability to withstand elevated temperatures without deleterious effects, in particular exhibiting the property of retaining a substantially constant resistance to deformation with respect to temperature up to a temperature of approximately $500°C$. In addition, all of the materials have compatible work-hardening properties, and the like, so that they may be readily secured together by roll-bonding techniques, or the like, with good control of layer thickness in the resultant composite material.

Thus, an improved composite thermostat material has been described in detail hereinabove which may be seen to be characterized by useful properties in terms of flexivity and resistivity, as well as being suitable for use over a substantial temperature range.

Various changes and modifications in the above-described embodiment will be readily apparent to those skilled in the art and any of such changes or modifications are deemed to be within the spirit and scope of the present invention as set forth in the appended claims.

I claim:

1. A composite thermostat material comprising a first outer layer of a first preselected metallic alloy having a relatively high coefficient of thermal expansion, a second outer layer of a second preselected metallic alloy having a relatively lower coefficient of thermal expansion than said first preselected metallic alloy, and an intermediate layer comprising a copper alloy having a resistivity between approximately 10 to 30 ohms per circular mil foot and having a substantially constant resistance to deformation with respect to temperature up to a temperature of approximately 500°C. selected from the group consisting of an alloy consisting essentially of, by weight, approximately 0.15 percent zirconium and the balance copper, an alloy consisting essentially of, by weight, approximately 0.95 percent chromium and the balance copper, and an alloy consisting essentially of, by weight, approximately 0.5 percent tellurium, 0.007 percent phosphorous and the balance copper, said first outer layer having a thickness between approximately 5 to 45 percent of the total thickness of said composite material and said second outer layer having a thickness between approximately 35 to 50 percent of the total thickness of said composite material, said first and second outer layers being bonded to respective opposite sides of said intermediate layer which has a thickness of approximately 5 to 60 percent of the total thickness of said composite material, said first preselected metallic alloy consisting essentially of, by weight, approximately 22 percent nickel, 3 percent chromium, and the balance iron, said second preselected metallic alloy consisting essentially of, by weight, approximately 35 ½ to 36 ½ percent nickel and the balance iron, said composite material having a flexivity of between approximately $100 \times 10^{-7}$ to $160 \times 10^{-7}$ inch per inch per degree Fahrenheit and a resistivity of between approximately 15 to 100 ohms per circular mil foot.

2. A composite thermostat material comprising a first outer layer of a first preselected metallic alloy having a relatively high coefficient of thermal expansion, a second outer layer of a second preselected metallic alloy having a relatively lower coefficient of thermal expansion than said first preselected metallic alloy, and an intermediate layer comprising a copper alloy having a resistivity between approximately 10 to 30 ohms per circular mil foot and having a substantially constant resistance to deformation with respect to temperature up to a temperature of approximately 500°C. selected from the group consisting of an alloy consisting essentially of, by weight, approximately 0.15 percent zirconium and the balance copper, an alloy consisting essentially of, by weight, approximately 0.95 percent chromium and the balance copper, and an alloy consisting essentially of, by weight, approximately 0.5 percent tellurium, 0.007 percent phosphorous and the balance copper, said first outer layer having a thickness between approximately 5 to 45 percent of the total thickness of said composite material and said second outer layer having a thickness between approximately 35 to 50 percent of the total thickness of said composite material, said first and second outer layers being bonded to respective opposite sides of said intermediate layer which has a thickness of approximately 5 to 60 percent of the total thickness of said composite material, said first preselected metallic alloy consisting essentially of, by weight, approximately 72 percent manganese, 18 percent copper, and 10 percent nickel, said second preselected metallic alloy consisting essentially of, by weight, approximately 35 ½ to 36 ½ percent nickel and the balance iron, said composite material having a flexivity of between approximately $100 \times 10^{-7}$ to $160 \times 10^{-7}$ inch per inch per degree Fahrenheit and a resistivity of between approximately 15 to 100 ohms per circular mil foot.

\* \* \* \* \*